US010240676B2

(12) United States Patent
Piepereit

(10) Patent No.: US 10,240,676 B2
(45) Date of Patent: Mar. 26, 2019

(54) SEAL SYSTEM

(71) Applicant: MATCON LTD, Worcestershire (GB)

(72) Inventor: Edward J. Piepereit, Worcestershire (GB)

(73) Assignee: MATCON LTD., Worcestershire (GB)

( * ) Notice: Subject to any disclaimer, the term of this patent is extended or adjusted under 35 U.S.C. 154(b) by 238 days.

(21) Appl. No.: 14/916,590

(22) PCT Filed: Sep. 4, 2014

(86) PCT No.: PCT/GB2014/052684
§ 371 (c)(1),
(2) Date: Mar. 4, 2016

(87) PCT Pub. No.: WO2015/033145
PCT Pub. Date: Mar. 12, 2015

(65) Prior Publication Data
US 2016/0230890 A1    Aug. 11, 2016

(30) Foreign Application Priority Data
Sep. 6, 2013 (GB) .................................. 1315944.7

(51) Int. Cl.
B01F 9/08 (2006.01)
F16J 15/16 (2006.01)
B01F 15/00 (2006.01)
B01F 7/00 (2006.01)
B01F 15/02 (2006.01)

(52) U.S. Cl.
CPC ........... *F16J 15/16* (2013.01); *B01F 7/00291* (2013.01); *B01F 9/08* (2013.01); *B01F 15/00* (2013.01); *B01F 15/00032* (2013.01); *B01F 15/00162* (2013.01); *B01F 15/00435* (2013.01); *B01F 15/00746* (2013.01); *B01F 15/0294* (2013.01); *F16J 15/162* (2013.01); *B01F 2015/00103* (2013.01)

(58) Field of Classification Search
USPC ....................................................... 366/331
See application file for complete search history.

(56) References Cited

FOREIGN PATENT DOCUMENTS

| EP | 0254826 | 2/1988 |
|----|---------|--------|
| EP | 0538975 | 4/1993 |
| EP | 2179787 | 4/2010 |
| EP | 2386351 | 11/2011 |
| GB | 1354979 | 6/1974 |
| WO | 94/25147 | 11/1994 |
| WO | 2004/076314 | 9/2004 |

OTHER PUBLICATIONS

International Search Report dated Feb. 12, 2015 for International Patent Application No. PCT/GB2014/052684.
Written Opinion of the International Searching Authority dated Feb. 12, 2015 for International Patent Application No. PCT/GB2014/052684.

*Primary Examiner* — Mark Halpern
(74) *Attorney, Agent, or Firm* — Morgan, Lewis & Bockius LLP

(57) ABSTRACT

A seal system (1) for use in mixing apparatus (2) comprising a rotating shaft (3) which passes through a fixed structure (4), the seal system (1) being adapted both to prevent egress of content from the apparatus, and to resist ingress of material into the seal system.

29 Claims, 7 Drawing Sheets

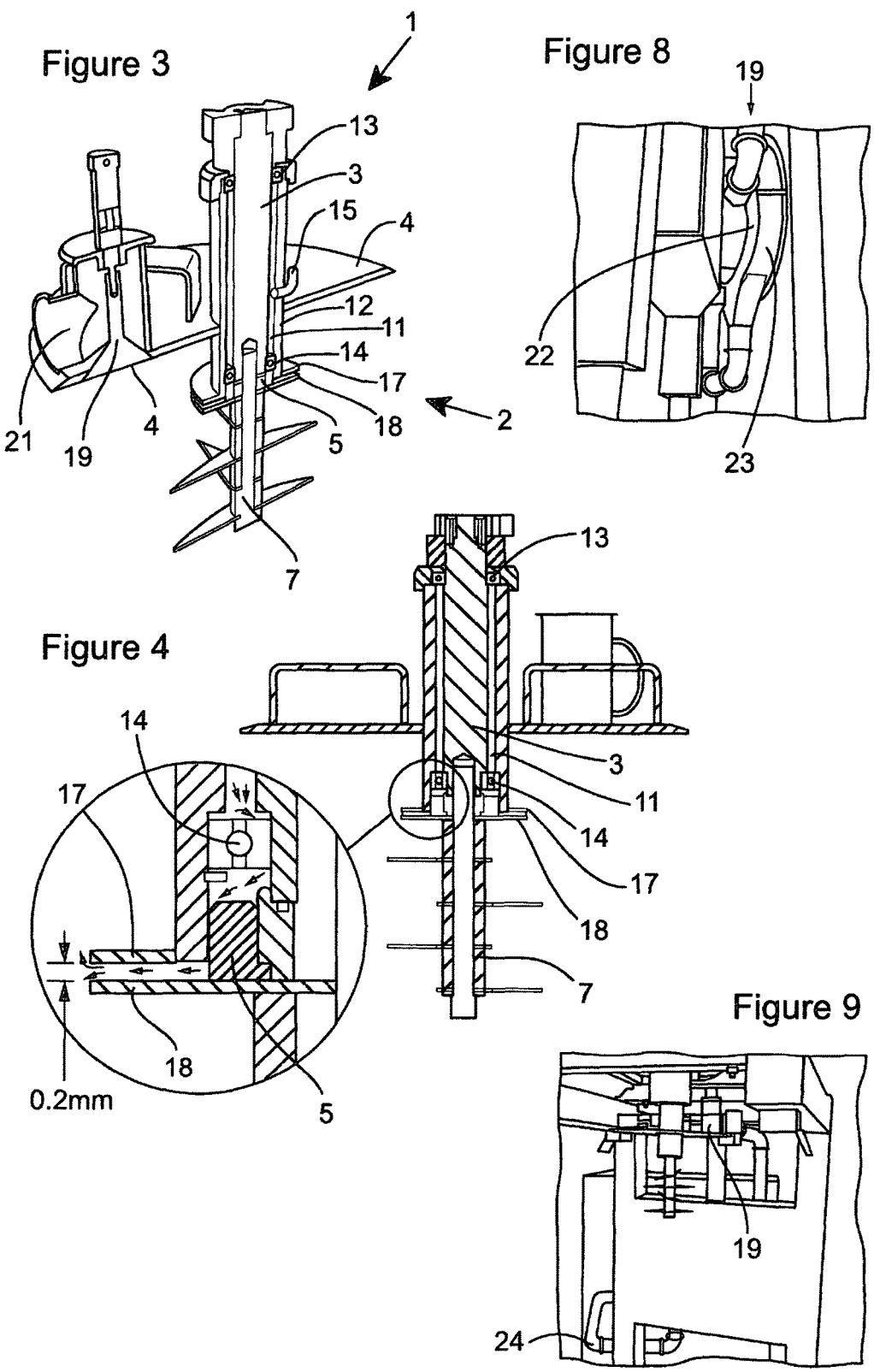

Figure 6
a.
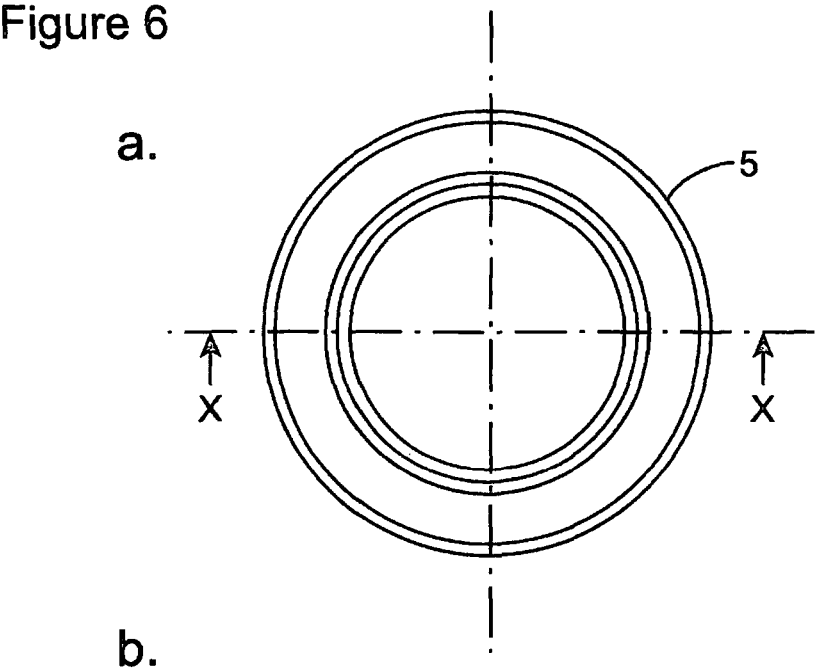
b.
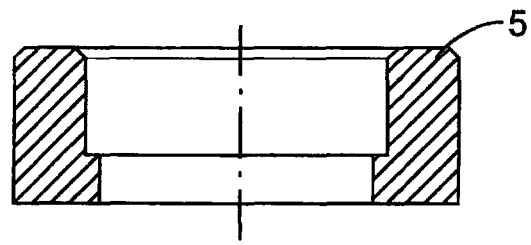
SECTION ON X-X
c.
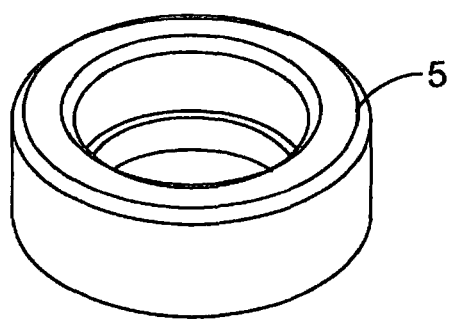

Figure 7
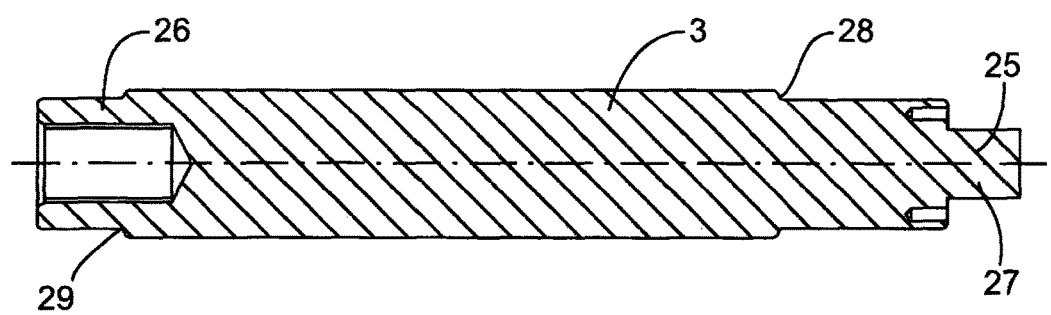
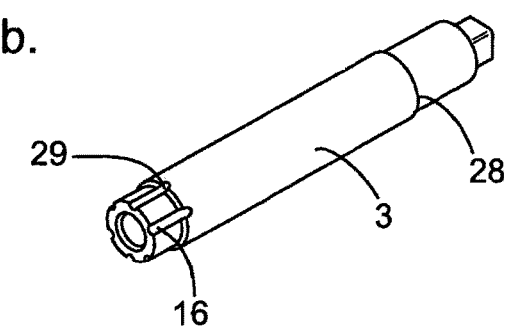
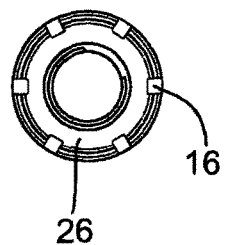 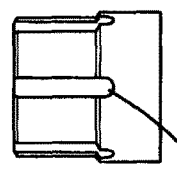 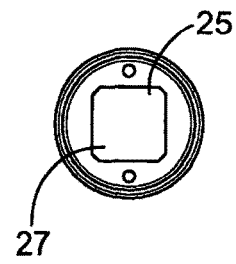

Figure 11
a.
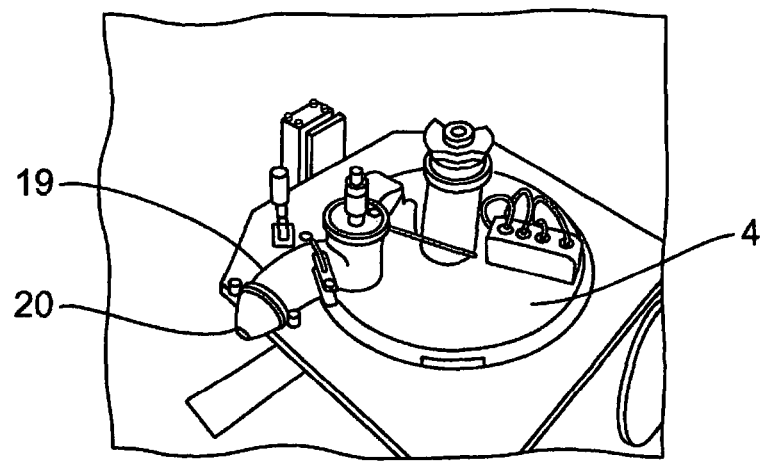
b.
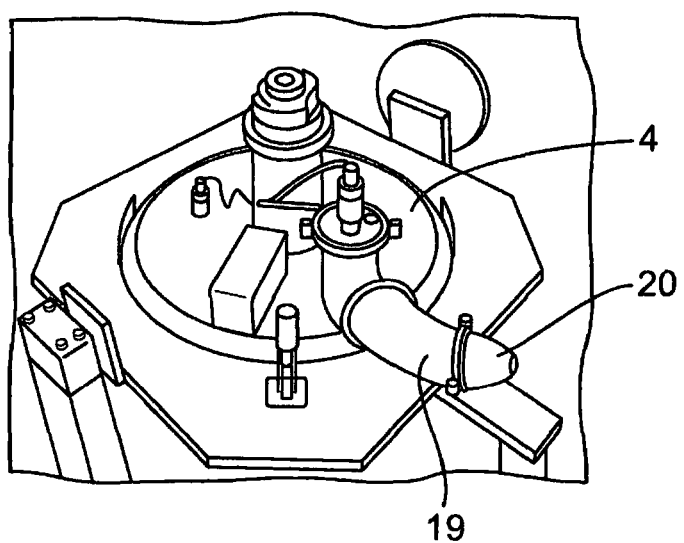

SEAL SYSTEM

CROSS-REFERENCE TO RELATED APPLICATIONS

This application is a National Stage Patent Application of International Application No. PCT/GB2014/052684, filed Sep. 4, 2014, which claims the benefit of GB Patent Application No. 1315944.7, filed Sep. 6, 2013, each of which is incorporated by reference herein in its entirety.

The invention relates to a seal system, and in particular to a seal system for use in apparatus for mixing the contents of a storage or containment container, in situ in the container, to prevent egress of content therefrom.

Apparatus for mixing the contents of storage and containment devices such as IBCs (Intermediate Bulk Containers) in-situ in the container is known. It provides the advantage that the constituents of mixtures such as foodstuffs and pharmaceuticals can be mixed in-situ in the container in which they are being stored and/or transported without the need to transfer them to a separate mixer and back again, thus saving time and expense. It also removes the need for cleaning of the mixing device before processing of the next mixture can occur, also saving time. Generally, such devices operate by moving the container including the contents relative to a fixed support, supported for example on the ground, so that the contents move inside the container and mixing occurs. An effective form of movement can be rotation of a container such as an IBC, end over end. In the art, such processes are commonly called tumble blending.

Known tumble blending apparatus can suffer from some disadvantages in some specific uses. For example, complete mixing of some constituent types is sometimes difficult to achieve for the very reason that the apparatus is only capable of mixing by movement of the entire container, and this can be a limitation on the utility of such devices when the constituents include particulates and fats. Also, with tumble blending there can be a tendency for the tumbling action to create balls of fat-rich powder which do not become homogeneously mixed. Incomplete mixing can also occur if insufficient airspace (known as ullage) is left in the container because the space available for movement of the contents is limited.

Recently, it has been suggested that problems such as these could be overcome if more conventional mixing procedures, such as for example high shear mixing, could be used in combination with tumble blending. The process of high shear mixing using a tumble blender adapted to receive and tumble a container is described in European Patent Publication Number 2386351. In that application there is described a tumble blender that includes a means to drive a high shear mixing device of an IBC whilst tumble blending is proceeding. However, a problem lies in how to incorporate such procedures into a tumble blender type device without sacrificing its many advantages or compromising its operation.

In addition, it is often required that during rotation, the mixer shaft is sealed in a manner such that the seal is capable of being immersed in the blended powder. Prior mixers have included sealing elements which are incapable of powder immersion, suffering high wear, especially with low-melt powders such as sugar and melanine. Conventional primary labyrinth seal shells fill with a small quantity of powder when immersed, which powder becomes hot and melts, for example forming caramel. During subsequent cooling, the caramel solidifies and adheres to the rubber lip element of the seal, which is ripped to shreds and thus significantly damaged during subsequent blend cycles.

The present invention seeks to address problems such as these.

According to the invention, there is provided a seal system for use in apparatus comprising a rotating shaft which passes through a fixed structure, the seal system being adapted both to prevent egress of content, and to resist ingress of material.

Preferably, the seal system comprises a fluid purge aspect and a mechanical shielding and clearing aspect.

Preferably, the fluid purge aspect comprises a fluid purged shaft seal, typically an air purged shaft seal.

Preferably, the shaft seal comprises at least one sealing element. Typically, the at least one sealing element is provided within the housing of the rotating shaft. Preferably, the at least one sealing element is provided in close radial clearance to the housing of the rotating shaft. Typically, the at least one sealing element is mounted at a radial clearance of between 0.1 mm and 2 mm, preferably approximately 0.2 mm with respect to the shaft housing. In a preferred embodiment, the at least one sealing element is rotatable with respect to the housing of the rotating shaft.

Preferably, the at least one sealing element comprises a plastics material, which material advantageously increases the life span of the sealing element.

Preferably, the rotating shaft comprises at least one spline defined within the surface thereof. Typically, the at least one spline is machined into the surface of the shaft. It is preferred that a plurality of splines are provided within the surface of the shaft, at regularly spaced intervals around the circumference thereof.

In a preferred embodiment, the at least one sealing element is positioned downstream, in terms of fluid flow, of the at least one spline. Preferably, the shaft comprises at least one shaft bearing. It is preferred that the at least one spline is disposed adjacent the at least one shaft bearing, the arrangement being such that air flow supplied upstream of the shaft bearing can pass the shaft bearing and be distributed to the back of the seal element. Advantageously, rotation of the at least one spline assists in control of air flow through the seal system and contributes to providing even distribution of air to the seal, thereby providing an even cushion of air around the complete periphery.

Preferably, the fluid purge aspect comprises at least one sealing element in fluid communication with an air channel. Preferably, the air channel is substantially circular and typically surrounds the rotating shaft. In a preferred embodiment, the seal system comprises an air inlet provided in fluid communication with the air channel. In a preferred embodiment, air enters the seal system via the air inlet and flows along the air channel towards the at least one sealing element.

Preferably, the mechanical shielding and clearing aspect comprises a plurality of shield elements provided in close proximity to the at least one sealing element. Preferably, the mechanical shielding and clearing aspect comprises two shield elements. Preferably, the shield elements are provided in the form of a circular disc. In one embodiment, the shield elements may comprise a plastics material. Typically, one shield element is stationary and the other shield element is rotatable with respect to the rotating shaft. Preferably, the stationary shield element is mounted on the rotating shaft housing and the rotatable shield element is mounted on the rotating shaft itself. Typically, the shield elements are mounted such that they are perpendicular to the vertical axis of the rotating shaft. Rotation of the rotatable shield element typically generates a centrifugal force. Preferably, the shield elements are spaced apart by a distance such that the centrifugal force generated during rotation causes material to be removed from the sealing element when exposed to air (i.e. when the seal is not immersed) and prevents or minimises the ingress of material when the seal is immersed during rotation. Additionally, air typically passes from the at least one sealing element to the space defined between the shield elements. The shield elements are also advantageously spaced apart by a distance such that air flow velocity is maximised, whilst preventing contact between the shield elements. Preferably, the shield elements are spaced apart by a distance of between 1.0 mm and 6.0 mm, more preferably between 1.0 mm and 3.0 mm, and most preferably between 1.5 mm and 3.0 mm. In one embodiment, the rotatable shield element may include at least one radial rib or fin defined within the surface thereof to assist in the removal of powder from the system.

Preferably, the seal system further comprises a container wherein the container is an Intermediate Bulk Container adapted for use in a tumble blender.

Preferably, the fixed structure may comprise a lid of the container. Preferably, the rotating shaft may be part of a mixer. Typically, the mixer passes through the lid of the container. In one embodiment, the mixer may further comprise at least one mixing blade. Advantageously, rotation of the container and the provision of a mixer may facilitate the homogeneous blending and enhance the mixing of the contents within the container. It has been found that adding the mixing action of a rotatable mixer, such as a high-shear mixer, is a particularly effective addition to tumble blending.

Preferably, the seal system further comprises drive means adapted to drive a rotatable mixer of the container. Preferably, the drive means comprises a drive shaft which is operable to engage with the mixer.

The seal system may further comprise receiving means for receiving the container for tumble blending, the receiving means being mounted to a non-moving support to move the container on an asymmetric axis. The receiving means may comprise a frame or cage, the frame being adapted to clamp containers of different sizes. Clamping may be hydraulically effected by moving a part or parts of the frame relative to other parts and thus, containers of different sizes may be accommodated. In such an arrangement, docking is preferably achieved during and by virtue of the operation in which the container is clamped in the apparatus prior to and for the purpose of tumbling.

Preferably, the receiving means is connectable to a main drive unit which may control rotation of the container. In one embodiment, the receiving means may be connected to the main drive unit by means of a fixed drive plinth.

Preferably, the seal system further comprises exhaust means operable to control the flow of air out of the container. Advantageously, the provision of a seal system comprising both an exhaust means and a seal means allows for control of air flow into and out of the container, and thus control of the air pressure within the container. Advantageously, the amount of air flow into the container is regulated in a manner such that it is substantially equal to the amount of air flow out of the container. Such a system advantageously prevents the build up of excessive air pressure within the container, thus improving safety.

The exhaust means may typically comprise at least one vent valve. The exhaust means may comprise a vent valve housing and may further comprise a nozzle. Preferably, the at least one vent valve is pneumatically actuated and preferably opens at least once per rotation of the container. Advantageously, the at least one vent valve opens when the valve is not immersed within the material, thus preventing blockage of the valve. In one embodiment, the at least one vent valve is cone-shaped. The provision of a vent valve having a cone shape has the advantage of minimising the build up of material on the surface thereof.

In a preferred embodiment, air passes from the vent valve to an extract duct via the nozzle. Preferably, the extract duct receives exhaust air from the nozzle, without being physically connected to the nozzle. Advantageously, the nozzle focuses the air flow into the nearby extract duct. Preferably, the extract duct is mounted at the rear of the cage and the supply of air passes behind the cage to an annular plate, located around the main drive shaft of the main drive unit.

Preferably, the seal system may further comprise an annular duct. Preferably, the annular duct is mounted around the main drive shaft. In a preferred embodiment, the annular duct is stationary. In one embodiment, the annular duct may be mounted on the fixed drive plinth that may connect the main drive unit with the cage. Preferably, the annular duct is mounted on the front face of the fixed drive plinth.

The annular duct typically cooperates with the annular plate to form a rotary coupling, advantageously facilitating control of the vacuum within the annular duct. In a preferred embodiment, the annular duct and annular plate cooperate to form a rotary coupling having a large diameter. Preferably, the annular duct may be connected to a factory dust extraction system.

Preferably, the seal system further comprises means for monitoring the pressure within the container and/or means for limiting the supply pressure to the container. The seal system may further comprise means for monitoring the position of the vent valve actuator. The provision of such monitoring means advantageously improves the safety of the system.

In a second aspect, the invention provides apparatus for mixing, comprising a seal system in accordance with the first aspect.

In a third aspect, the invention provides a method for sealing a container, the method comprising the use of a seal system in accordance with the first aspect.

In a fourth aspect, the invention provides a method for mixing, the method comprising the use of the apparatus in accordance with the second aspect.

The invention will further be described by way of example and with reference to the following illustrated in the following figures, in which:

FIG. 3 is a sectional perspective view of part of the apparatus according to one aspect of the invention;

FIG. 4 is a sectional schematic view of part of the apparatus of FIG. 3;

FIG. 6a is a plan view from above of part of the apparatus of FIG. 3;

FIG. 6b is a plan view of the apparatus of FIG. 6a, showing the section through X-X;

FIG. 6c is an isometric view of the apparatus of FIG. 6a;

FIG. 7a-e is a multiple view diagram of the shaft;

FIG. 8 is a perspective view of part of the apparatus according to an embodiment of the invention;

FIG. 9 is a perspective view of a part of the apparatus according to an embodiment of the invention;

FIG. 10a is a schematic view from the above of the apparatus of FIG. 8;

FIG. 10b is a side schematic view of the apparatus of FIG. 8;

FIG. 10c is a perspective schematic view of the apparatus of FIG. 8;

FIGS. 11a and 11b are a perspective view from above of part of the apparatus of FIG. 3.

Figure 1:
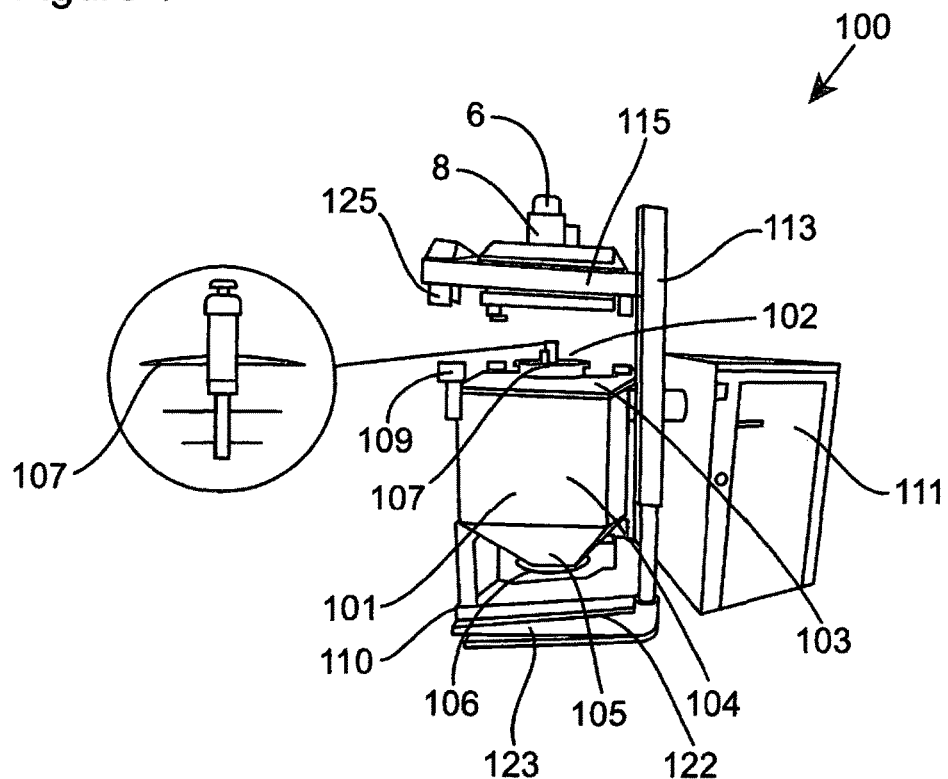
FIG. 1 is a side perspective view of apparatus according to the prior art.

Referring to the Figures, and in particular to FIGS. 1 and 2a to 2d, there is illustrated known apparatus 100 for mixing contents contained in a storage or transport container 101 in situ in the container. FIG. 1 shows a container 101 of known configuration, referred to as an Intermediate Bulk Container or IBC. The IBC is shown in place on apparatus 100 in order to illustrate the functioning of the apparatus, but the IBC does not form part of the apparatus 100. The IBC has an inlet 102 located on a top surface 103, a square section main body part 104 and a lower section 105 in the form of an inverted truncated pyramid. An outlet 106 is located at the bottom, as viewed, of the lower section 105. The top of the IBC is normally obturated by a simple lid closure 107 and the outlet 106 is obturated by a conical valve that can be raised into the lower section 105 to allow mass to flow out of the container. The IBC also includes top and bottom stacking features, 109, 110. The apparatus also comprises a mixer drive assembly 6 comprising a drive shaft 8.

The schematic sequence shown in FIGS. 2a to 2d illustrates operation of the apparatus 100. Firstly, an IBC 101 is placed by suitable means such as a fork-lift so that it rests upon lower frame 122, with bottom stacking features 110 and locating formations 125 in register and the outlet of the container located in locator 123, which is the primary locator for accuracy. The IBC is then clamped in place by activating the hydraulic rams to move the lower frame arms 123 towards the upper frame 115, bringing top stacking features 109 and locating formations 125 into register and securing the IBC in place so that it cannot move relative to the cage 113. The cone valve is clamped in place, for example by vacuum, and sensors (not shown) verify that a top lid closure 107 is in place. The apparatus 100 also includes a switch (not shown) activated only when the IBC is in place and a clamp pressure monitor (not shown).

Figure 2:
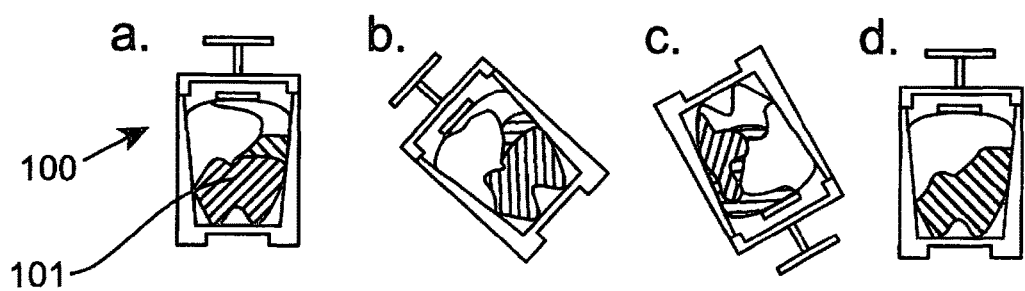
FIGS. 2a to 2d are a schematic representation of apparatus according to the prior art.

FIG. 2a shows the IBC clamped, ready for blending. Blending takes place by tumbling the IBC end over end, on an asymmetric axis, causing the contents to flow over each other. FIGS. 2b and 2c show the start of the blend cycle and the blender running, respectively. FIG. 2d illustrates the IBC ready for unloading.

An operator panel (not shown) is provided to include controls for Start, Stop, Clamp, Unclamp, Reset and E-Stop, with Cycle Time and Rotating Speed displays as well as a Status lamp.

As can be seen in FIGS. 3 to 10, the basic components of the apparatus of the present invention are substantially similar to the prior art apparatus described above, and like components will be described using the same reference numerals for the sake of clarity.

Referring to the Figures, and in particular FIGS. 3 to 11, there is illustrated a seal system 1 for use in apparatus 2 including a rotating shaft 3 which passes through a fixed structure 4, the seal system 1 comprising seal means 5 to prevent egress of content, the seal means 5 being adapted to resist ingress of material when the seal is immersed therein.

The seal system provides a fluid purge aspect and a mechanical shielding and clearing aspect.

The apparatus 2 comprises a mixer drive assembly 6 adapted to drive a rotatable mixer 7 of the container. The drive means comprises a drive shaft 8 and is movable by a part of the mixer 7 of the container 101 on docking. Thus, correct alignment of the mixer 7 with the drive means is achieved through and by virtue of the docking action.

The seal system may typically be connectable to a main drive unit 9 which may control rotation of the container. In one embodiment, the seal system may be connected to the main drive unit 9 by means of a fixed drive plinth 10.

Figure 5:
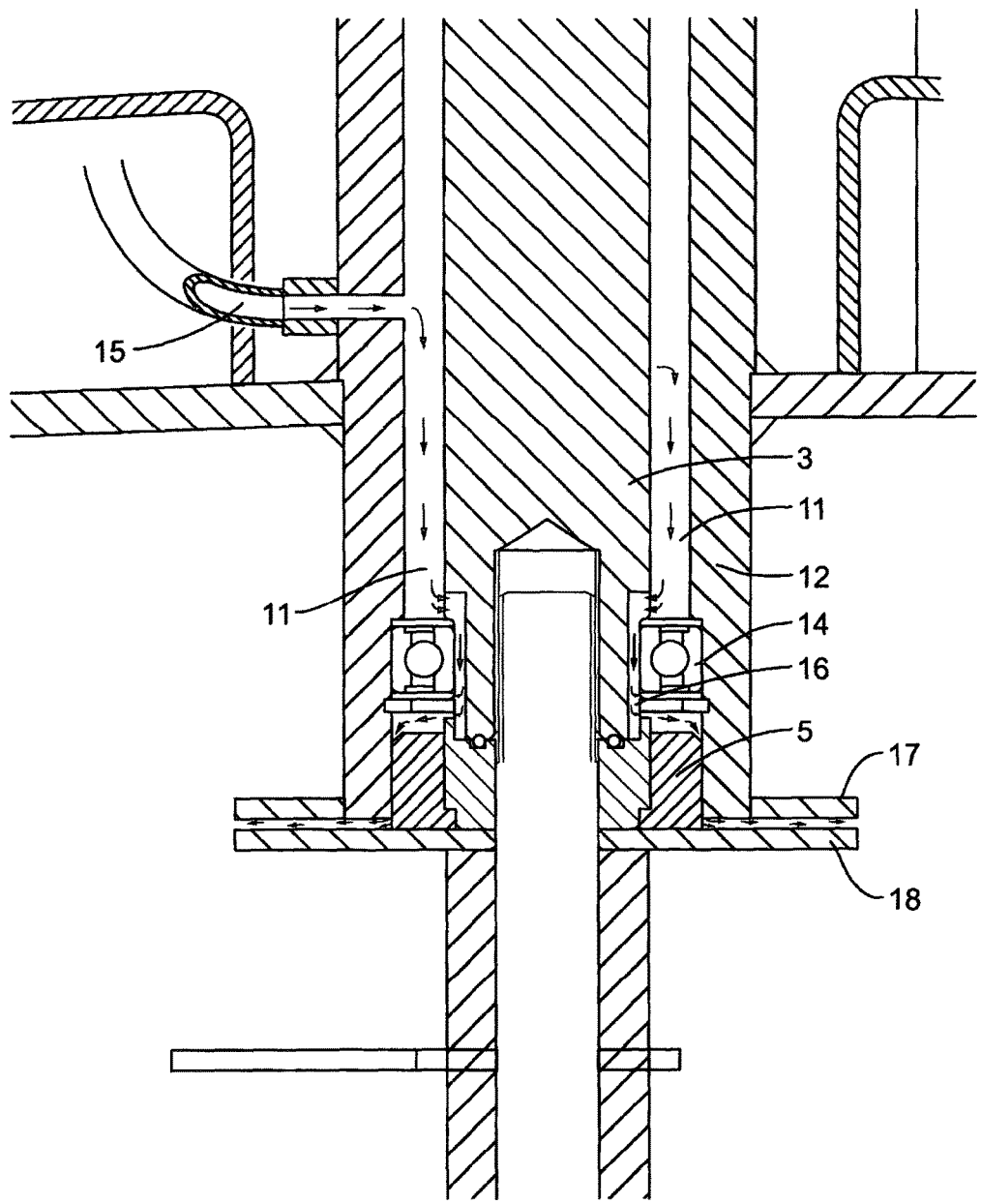
FIG. 5 is a sectional schematic view of part of the apparatus of FIGS. 3 and 4.

With reference to the apparatus shown in FIGS. 3, 4 and 5, the fluid purge aspect is provided in the form of an air purged shaft seal. The air purged shaft seal comprises a seal element 5 which is provided in fluid communication with an air channel 11 provided within the rotating shaft housing 12. As illustrated in FIG. 6, the seal element 5 is substantially circular in shape. Preferably, the air channel 11 is substantially circular and surrounds the rotating shaft. Preferably, the air channel 11 is provided within the housing of the rotating shaft assembly and extends along the length thereof. The seal element 5 is typically mounted in close radial clearance to the housing of the rotating shaft 3. Preferably, the seal element 5 is provided at a radial clearance of approximately 0.2 mm of the housing of the rotating shaft. The rotating shaft assembly comprises upper and lower bearings 13, 14, which bearings are provided within the air channel 11. An air inlet 15 is provided in fluid communication with the air channel 11. Typically, air enters the air channel 11 via the air inlet 15 and passes along the space defined between the bearings 13, 14. Additionally, a plurality of splines are machined into the surface of the rotating shaft 3, and are provided at regularly spaced intervals on the surface thereof. Typically, the seal element 5 is provided such that it is downstream of the plurality of splines 16. Typically, air enters the rotating shaft housing via the air inlet 15 and passes along the air channel 11 in the direction shown by the arrows in FIGS. 4 and 5. The splines 16 rotate with the shaft 3 and the flow of air is distributed to the back of the seal element 5.

With reference to FIG. 7a, the rotating shaft 3 has a longitudinal and substantially circular shape and comprises a drive end 25 and a spline end 26. The drive end 25 of the shaft comprises a substantially square element 27 operable to engage with the drive assembly 8 to drive rotation of the shaft 3. The drive end 25 also comprises a chamfer 28, provided around the circumference of the shaft surface. The spline end 26 of the shaft comprises at least one spline 16 defined within the surface thereof. Preferably, six splines are defined within the surface of the shaft, wherein the splines are provided at regular intervals around the shaft surface. A second chamfer 29 is provided at the spline end 26 of the shaft 3, around the circumference of the shaft surface.

The mechanical shielding and clearing aspect comprises at least one shield element 17, 18 provided in close proximity to the at least one sealing element 5. The at least one shield element is provided in the form of a pair of flat circular shield discs. The shield elements are mounted such that they are perpendicular to the vertical axis of the rotating shaft 3. One shield disc 17 is mounted on the shaft housing 12 and fixed in place, the other shield disc 18 is mounted on the rotating shaft 3 itself. In the embodiment shown in FIGS. 3, 4 and 5, one of the shield elements 18 is provided such that it rotates with respect to the shaft housing 12 while the other shield element 17 is stationary with respect to the shaft housing 12. Advantageously, the shield elements 17, 18 are spaced apart by a distance such that the centrifugal force generated during rotation of one of the shield elements 18 causes powder to be removed from the seal element 5 when exposed to air (i.e. during rotation when the shield element is not immersed in the powder) and prevents or minimises ingress of powder when the shield element is immersed during rotation. Preferably, the shield discs are spaced apart by a distance of 3.0 mm. Advantageously, air flows through the small radial clearance between the seal element 5 and the housing 12, effectively preventing ingress of powder and passes between the circular discs into the IBC.

The fixed structure of the seal system is provided in the form of a lid 4 of the container. The rotating shaft 3 is part of a mixer 7 which is provided through the lid 4 of the container. Advantageously, the rotation of the container and the provision of a mixer 7 facilitate the homogeneous blending and enhance the mixing of the contents within the container. It has been found that adding the mixing action of a rotatable mixer 7, such as a high-shear mixer, is a particularly effective addition to tumble blending.

With reference to FIGS. 3, 8, 9, 10 and 11, the seal system further comprises an exhaust system, comprising a pneumatically actuated vent valve 19 which typically opens once per blender rotation. Typically, the speed of rotation of the container is approximately 8 to 16 rpm.

The opening of the actuated vent valve 19 only occurs for a short period of time and only occurs in conditions when the vent valve 19 is exposed to the air (i.e. when the vent valve is not immersed within the powder). FIG. 9 illustrates the main drive unit and cage (without the container) and shows the location of the vent valve assembly. FIG. 11 illustrates the vent valve 19 and lid 4 of the apparatus, wherein the apparatus is mounted on a maintenance trolley. In the embodiment shown in FIGS. 3 and 11, the vent valve 19 is cone shaped to prevent the build up of powder on the surface thereof. The exhaust air is typically directed from the vent valve 19 via a nozzle 20 and an open connection into an extract duct 21 which is routed towards the rear of the rotating blender cage. The extract duct 21 receives exhaust air from the nozzle 20 without being physically connected thereto. Advantageously, the nozzle 20 focuses the air flow into the nearby extract duct 21. The duct assembly terminates in an annular plate 22 located around the main drive shaft.

Figure 10:
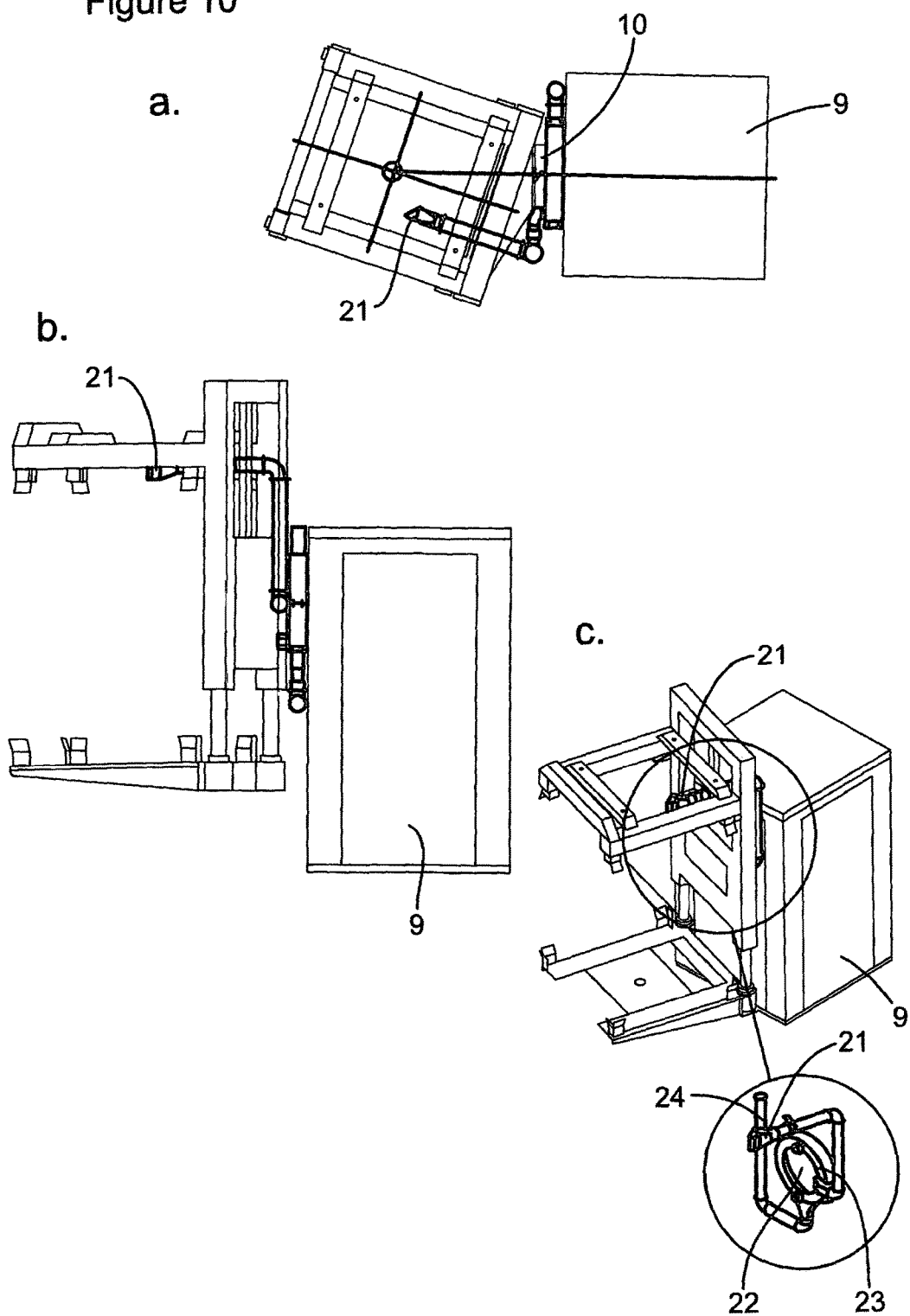

As shown in FIGS. 8 & 10 (which illustrates the main drive unit and cage of the apparatus, without a container), at the rear of the blender cage, mounted on the fixed drive plinth 10, is an annular duct 23. The annular duct 23 is stationary and acts in combination with the rotating annular plate 22 to maintain the extract vacuum irrespective of the position of the cage. The combination of the annular exhaust duct 23 and the annular plate 22 forms a rotary coupling having a large diameter. The annular duct 23 is connected to the factory dust extraction system (not shown), via duct 24.

Operationally, the rate of air flow into the seal system and the time interval at which the vent valve 19 opens and closes, are adjustable so as to prevent over-pressure within the container.

Advantageously, the seal system further comprises means of monitoring the pressure within the container and means of limiting the amount of pressure supplied to the container. In addition, the seal system comprises means for monitoring the position of the vent valve actuator. The provision of such monitoring means advantageously improves the safety of the seal system.

The invention also provides apparatus for mixing, comprising a seal system as defined above and illustrated in FIGS. 3 to 11.

The invention also provides a method for sealing a container, the method comprising the use of a seal system as defined above and with reference to FIGS. 3 to 11.

The invention also provides a method for mixing, the method comprising the use of the apparatus as defined above and with reference to FIGS. 3 to 11.

The invention claimed is:

1. A seal system for use in a mixing apparatus comprising:
    a rotating shaft which passes through a fixed structure and is sealed to the fixed structure with a seal system, the seal system configured to prevent egress of content from the mixing apparatus out of the fixed structure, and resist ingress of material into the fixed structure;
    a container coupled to the fixed structure wherein the container is an Intermediate Bulk Container adapted for use in a tumble blender; and
    an exhaust coupled to the container and configured to control a flow of air out of the container, the exhaust including at least one vent valve, the at least one vent valve being pneumatically actuated.

2. The seal system according to claim 1, wherein the seal system includes a fluid purge device and a mechanical shielding and clearing device.

3. The seal system according to claim 2, wherein the fluid purge device comprises a fluid purged shaft seal.

4. The seal system according to claim 2, wherein the fluid purge device comprises an air purged shaft seal.

5. The seal system according to claim 2, wherein the fluid purge device comprises at least one sealing element in fluid communication with an air channel.

6. The seal system according to claim 5, wherein the air channel is substantially circular and surrounds the rotating shaft.

7. The seal system according to claim 5, wherein an air inlet is provided in fluid communication with the air channel.

8. The seal system according to claim 2, wherein the mechanical shielding and clearing device comprises a plurality of shield elements.

9. The seal system according to claim 8, wherein the mechanical shielding and clearing device comprises two shield elements.

10. The seal system according to claim 8, wherein the shield elements are provided in the form of a circular disc.

11. The seal system according to claim 8, wherein the plurality of shield elements comprises one shield element which is stationary and another shield element which is rotatable with the rotating shaft.

12. The seal system according to claim 1, wherein the seal system includes at least one sealing element.

13. The seal system according to claim 12, wherein the rotating shaft includes a housing and the at least one sealing element is provided within the housing of the rotating shaft.

14. The seal system according to claim 13, wherein the at least one sealing element is provided in close radial clearance to the housing of the rotating shaft.

15. The seal system according to claim 13, wherein the at least one sealing element is rotatable with respect to the housing of the rotating shaft.

16. The seal system according to claim 12, wherein the at least one sealing element comprises a plastic material.

17. The seal system according to claim 1, wherein the rotating shaft comprises at least one spline defined within a surface thereof.

18. The seal system according to claim 17, wherein the at least one spline is positioned such that it is adjacent to and allows fluid to pass by, a bearing of the rotating shaft.

19. The seal system according to claim 1, wherein the rotating shaft is part of a mixer.

20. The seal system according to claim 19, wherein the mixer further comprises at least one mixing blade.

21. The seal system according to claim 1, further comprising a drive means adapted to drive a rotatable mixer of the container.

22. The seal system according to claim 1, wherein the at least one vent valve opens at least once per rotation of the container.

23. The seal system according to claim 1, wherein the at least one vent valve is cone-shaped.

24. The seal system according to claim 1, wherein air passes from the at least one vent valve to an extract duct via a nozzle.

25. The seal system according to claim 1, wherein the seal system includes an annular plate.

26. The seal system according to claim 25, wherein the seal system includes an annular duct.

27. The seal system according to claim 26, wherein the annular duct cooperates with the annular plate to form a rotary coupling.

28. The seal system according to claim 1, further comprising means for monitoring the pressure within the container and/or means for limiting the supply pressure to the container.

29. The seal system according to claim 1, further comprising means for monitoring a position of an actuator of the at least one vent valve.

* * * * *